(12) United States Patent
Maie et al.

(10) Patent No.: US 11,040,443 B2
(45) Date of Patent: Jun. 22, 2021

(54) ROTATIONAL ANGLE LIMITING MECHANISM

(71) Applicant: MITUTOYO CORPORATION, Kanagawa (JP)

(72) Inventors: Hiromu Maie, Kawasaki (JP); Tomohiro Arizono, Tokyo (JP)

(73) Assignee: MITUTOYO CORPORATION, Kanagawa (JP)

( * ) Notice: Subject to any disclaimer, the term of this patent is extended or adjusted under 35 U.S.C. 154(b) by 58 days.

(21) Appl. No.: 16/225,157

(22) Filed: Dec. 19, 2018

(65) Prior Publication Data

US 2019/0193264 A1 Jun. 27, 2019

(30) Foreign Application Priority Data

Dec. 22, 2017 (JP) .............................. JP2017-246090

(51) Int. Cl.
| | |
|---|---|
| *B25J 9/10* | (2006.01) |
| *B25J 19/00* | (2006.01) |
| *G01B 11/24* | (2006.01) |
| *G05G 5/04* | (2006.01) |
| *B25J 19/02* | (2006.01) |
| *G01B 11/00* | (2006.01) |
| *G01B 5/00* | (2006.01) |

(52) U.S. Cl.
CPC ........... *B25J 9/101* (2013.01); *B25J 19/0041* (2013.01); *B25J 19/021* (2013.01); *G01B 5/0004* (2013.01); *G01B 11/005* (2013.01); *G01B 11/24* (2013.01); *G05G 5/04* (2013.01)

(58) Field of Classification Search
CPC ...... B25J 9/101; B25J 19/0041; B25J 19/021; G05G 5/04; Y10T 74/1418; Y10T 74/1412; F16H 25/2015; G01B 11/24
See application file for complete search history.

(56) References Cited

U.S. PATENT DOCUMENTS

| | | | | |
|---|---|---|---|---|
| 2,978,924 A | * | 4/1961 | Georges ................ | G05G 15/04 74/526 |
| 4,815,339 A | * | 3/1989 | Bonadies ............ | B23Q 16/001 192/139 |

(Continued)

FOREIGN PATENT DOCUMENTS

JP 2006-064512 A 3/2006

*Primary Examiner* — Daniel D Yabut
(74) *Attorney, Agent, or Firm* — Greenblum & Bernstein, P.L.C.

(57) ABSTRACT

A Z slider includes a rotating shaft capable of at least one revolution centered on a rotation axis, in a state Where the rotating shaft supports a measurement head that is connected to a plurality of cables; a θ axis drive motor that causes the rotating shaft, to perform normal rotation in a clockwise direction and reverse rotation in a counterclockwise direction; and an oscillating link that oscillates in a state of contact with the rotating shaft when the rotating shaft is performing normal rotation in the clockwise direction and limits normal rotation in the clockwise direction that is equal to or greater than a predetermined angle, and that oscillates in a state of contact with the rotating shaft when the rotating shaft is performing reverse rotation in the counterclockwise direction and limits reverse rotation in the counterclockwise direction that is equal to or greater than a predetermined angle.

16 Claims, 10 Drawing Sheets

(56) References Cited

U.S. PATENT DOCUMENTS

| | | | | |
|---|---|---|---|---|
| 4,879,499 A * | 11/1989 | Iwata | ..................... | B25J 9/101 |
| | | | | 318/568.16 |
| 5,558,196 A * | 9/1996 | Nihei | ..................... | B25J 9/101 |
| | | | | 192/142 R |
| 6,065,364 A * | 5/2000 | Shiraki | .................... | B25J 9/101 |
| | | | | 74/490.01 |
| 10,113,851 B2 | 10/2018 | Ooyama et al. | | |
| 2011/0083497 A1* | 4/2011 | Matsumiya | ......... | G01B 11/245 |
| | | | | 73/105 |

* cited by examiner

Case 1

Case 2

Case 3

Case 4

ROTATIONAL ANGLE LIMITING MECHANISM

CROSS-REFERENCE TO RELATED APPLICATIONS

The present application claims priority under 35 U.S.C. § 119 of Japanese Application No. 2017-246090, filed on Dec. 22, 2017, the disclosure of which is expressly incorporated by reference herein in its entirety.

BACKGROUND OF THE INVENTION

1. Field of the Invention

The present invention relates to a rotation angle limiting mechanism of a rotating member that is capable of at least one revolution.

2. Description of Related Art

A rotation mechanism that rotates a measurement bead measuring a measured object is provided to a measurement device or the like. For example, in Japanese Patent Laid-open Publication No. 2006-064512, described below, a surface texture measuring apparatus is disclosed which measures an internal diameter or the like of a measured object that is fixed to a stage while rotating, relative to the measured object, a rotating member that supports a measurement head.

Normally, a cable (for example, a signal cable, power supply cable, or the like) is connected to the measurement head as described above. When a plurality of cables is connected to the measurement head, an excessive load may act on the cables due to the cables twisting when the rotating member rotates. This may result in the cables breaking or the like. In particular, when the rotating member of the surface texture measuring apparatus described above rotates multiple times, the twisting of the cables is likely to increase, and therefore becomes more likely to cause an excessive load to act on the cables.

SUMMARY OF THE INVENTION

The present invention has been conceived in light of the circumstances above, and inhibits an excessive load caused by rotation of a rotating member from acting on a cable.

A first aspect of the present invention provides a rotation angle limiting mechanism that includes a rotating member capable of at least one revolution centered on a predetermined rotation axis, in a state where the rotating member supports a support body that is connected to a plurality of cables; a driver that causes the rotating member to perform normal rotation in a first direction as well as reverse rotation in a second direction that is the reverse direction of the first direction; and a rotation angle limiting member that oscillates in a state of contact with the rotating member when the rotating member is performing normal rotation in the first direction and limits normal rotation in the first direction that is equal to or greater than a predetermined angle, and that oscillates in a slate of contact with the rotating member when the rotating member is performing reverse rotation in the second direction and limits reverse rotation in the second direction that is equal to or greater than a predetermined angle.

The support body may also be a measurement head measuring a surface texture of an interior wall of a measured object without contact.

In addition, the rotating member may be configured to include a projecting pin that is provided so as to be capable of making contact with the rotation angle limiting member. The rotation angle limiting member may also be configured such that, when the rotating member performs normal rotation in the first direction, the rotation angle limiting member limits normal rotation that is equal to or greater than a predetermined angle in the first direction by oscillating by a predetermined angle in one direction from a standby position in a state where a first side surface of the rotation angle limiting member is in contact with the projecting pin; and when the rotating member performs reverse rotation in the second direction, the rotation angle limiting member limits reverse rotation that is equal to or greater than a predetermined angle in the second direction by oscillating by a predetermined angle in the reverse direction from the standby position in a state where a second side surface on the opposite side from the first side surface is in contact with the projecting pin.

The rotation angle limiting mechanism may also be configured to further include a first regulating pin that, when the rotating member performs normal rotation in the first direction, makes contact with the rotation angle limiting member oscillating in the one direction from the standby position and regulates the oscillation of the rotation angle limiting member; and a second regulating pin that, when the rotating member performs reverse rotation in the second direction, makes contact with the rotation angle limiting member oscillating in the reverse direction from the standby position and regulates the oscillation of the rotation angle limiting member.

In addition, the rotation angle limiting mechanism may be configured to further include a first sensor that is blocked by the rotation angle limiting member oscillating in the one direction; a second sensor that is blocked by the rotation angle limiting member oscillating in the reverse direction; and a controller that stops the normal rotation of the rotating member in the first direction when the first sensor is blocked, and slops the reverse rotation of the rotating member in the second direction when the second sensor is blocked.

The rotation angle limiting mechanism may also be configured to further include a first biasing member biasing the rotation angle limiting member oscillating in the one direction toward the standby position; and a second biasing member biasing the rotation angle limiting member oscillating in the reverse direction toward the standby position.

In addition, the driver may be provided to a first axis direction end of the rotation axis, and the rotation angle limiting mechanism may be configured to further include a bearing that is provided to a second axis direction end and that supports the rotating member.

The controller may also be configured to perform normal rotation in the first direction and reverse rotation in the second direction for the rotating member and to position the rotating member in a reference position during initialization operations after powering on a device in which the rotation angle limiting mechanism is installed.

In addition, the controller may be configured such that, the rotating member is rotated in the second direction to a predetermined rotation position during the initialization operations, and when the second sensor is not blocked until the rotating member is rotated to the predetermined rotation position, the rotating member that is positioned in the predetermined rotation position is rotated in the first direction to position the rotating member at the reference position, and when the second sensor is blocked during rotation toward the predetermined rotation position, the rotating member, for which rotation in the second direction is stopped, is rotated in the first direction to position the rotating member at the predetermined rotation position, after which the rotating member is further rotated in the first direction to position the rotating member at the reference position.

According to the present invention, an excessive load caused by rotation of a rotating member can be inhibited from acting on a cable.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar puns throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
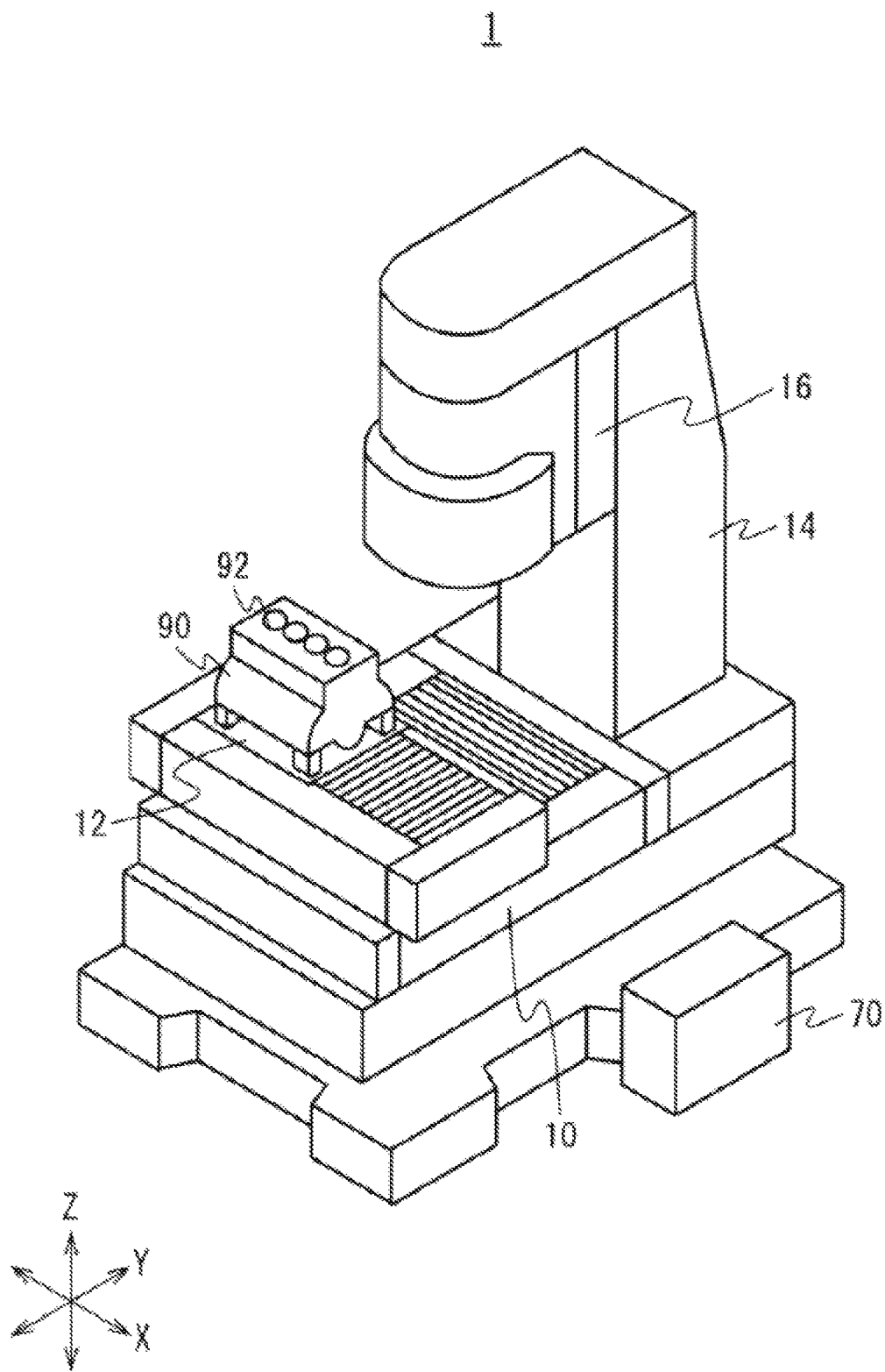
FIG. 1 is a perspective view illustrating an exemplary external configuration of a surface texture measuring apparatus 1 according to an embodiment.
Figure 2:
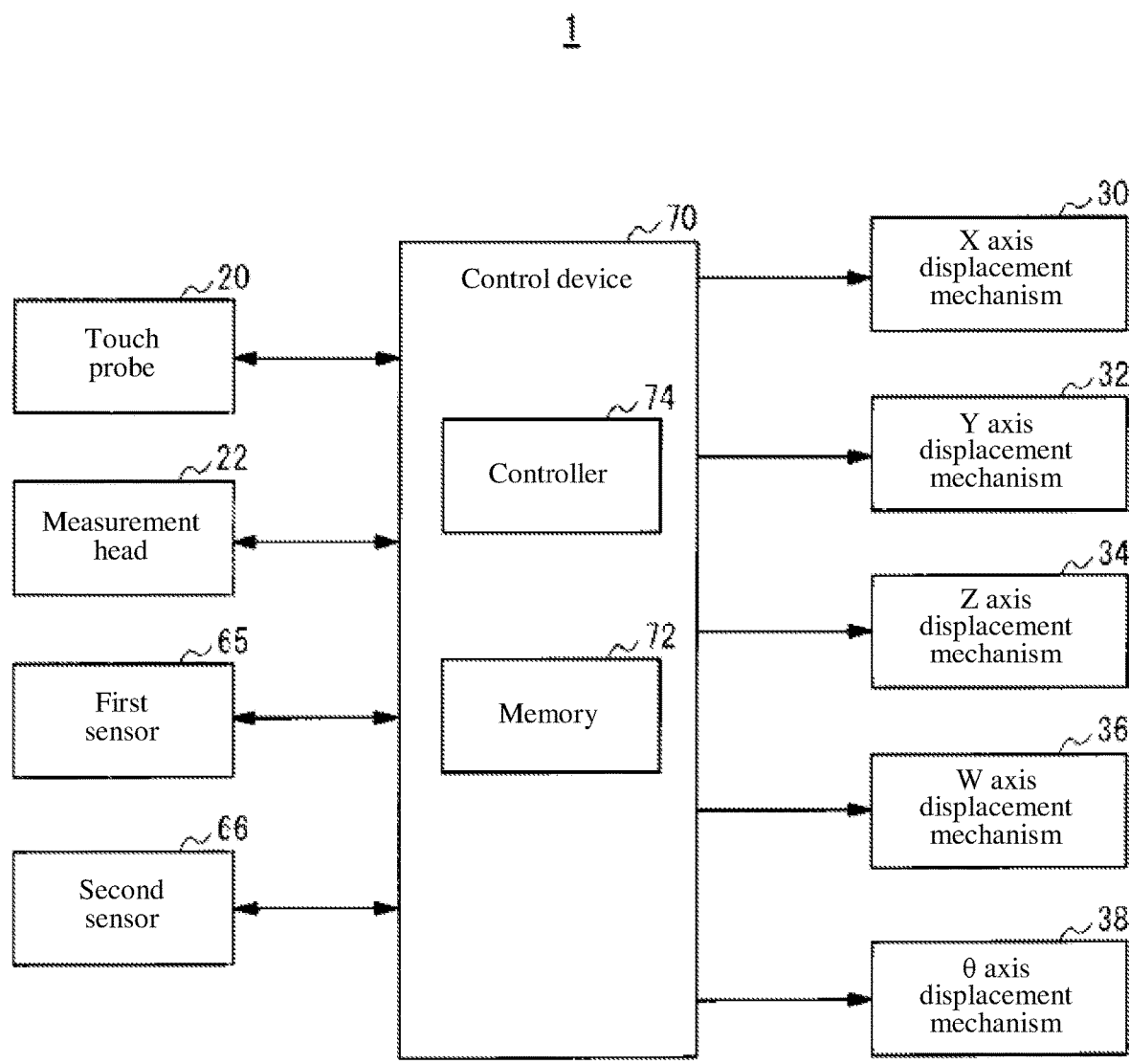
FIG. 2 is a block diagram illustrating a configuration of the surface texture measuring apparatus 1.

Configuration of Surface Texture Measuring Apparatus
Before describing a configuration of a rotation angle limiting mechanism according to an embodiment of the present invention, a description is given of a configuration of a surface texture measuring apparatus 1 in which the rotation angle limiting mechanism is installed, with reference to FIGS. 1 and 2.

FIG. 1 is a perspective view illustrating an exemplary external configuration of the surface texture measuring apparatus 1 according to the embodiment. FIG. 2 is a block diagram illustrating the configuration of the surface texture measuring apparatus 1. As shown in FIGS. 1 and 2, the surface texture measuring apparatus 1 includes a table 10, a stage 12, a support column 14, a Z slider 16, a touch probe 20, a measurement head 22 (head, support, or support body), an X axis displacement mechanism 30, a Y axis displacement mechanism 32, a Z axis displacement mechanism 34, a W axis displacement mechanism 36, a θ axis displacement mechanism 38, and a control device 70.

The surface texture measuring apparatus 1 is a device that measures a surface texture of an interior wall 92 of a measured object 90. In the following description, the measured object 90 is a cylinder block of an engine. The cylinder block has four cylinders (cylindrical portions), for example, and the surface texture measuring apparatus 1 measures the surface texture of the interior walls 92 of the four cylinders. The surface texture measuring apparatus 1 is capable of measuring the surface texture of the interior walls 92 without disassembling or cutting the measured object 90.

The table 10 is the base of the surface texture measuring apparatus 1. For example, the table 10 is arranged on an anti-vibration table installed on a shop floor. The anti-vibration table prevents vibrations in the shop floor from being transmitted to the table 10.

The stage 12 is provided on the table 10. The measured object 90 is placed on the stage 12. The stage 12 is capable of displacement in X and Y axis directions using the X axis displacement mechanism 30 and the Y axis displacement mechanism 32. The measured object 90 may also be placed on the stage 12 using a dedicated jig so as to allow measured objects 90 having a wide variety of shapes to be placed on the stage 12.

The support column 14 is provided rising along a Z axis direction from a top surface of the table 10. The support column 14 supports the Z slider 16 such that the Z slider 16 is capable of displacement in the Z axis direction.

The Z slider 16 is capable of displacement in the Z axis direction, relative to the support column 14, using the Z axis displacement mechanism 34 (specifically, a motor that is not shown in the drawings). The touch probe 20 and the measurement head 22 are mounted to the Z slider 16 (see FIG. 4). Details of the Z slider 16 configuration are described hereafter.

The touch probe 20 touches the measured object 90 and measures coordinates of the measured object 90, for example. Because the touch probe 20 is mounted to the Z slider 16, the touch probe 20 displaces in the Z axis direction in conjunction with the displacement of the Z slider 16 in the Z axis direction. The Z slider 16 includes a displacement mechanism displacing the touch probe 20 upward and downward between a measurement position and a standby position in the Z axis direction.

The measurement head 22 is an optical head measuring the surface texture of the interior wall 92 without contact. The measurement head 22 extends in the Z axis direction below the Z slider 16, and displaces in the Z axis direction in conjunction with the displacement of the Z slider 16 in the Z axis direction. The measurement head 22 includes a measurement sensor 24 (see FIGS. 3A to 3C) that measures the surface texture of the interior wall 92 without contact.

The measurement sensor 24 measures a three-dimensional shape of the interior wall 92, for example, as the surface texture. Accordingly, unevenness of the interior wall 92 can be measured, and a volume of an indentation or a distribution of indentations can be measured, for example. The measurement sensor 24 is, for example, an optical interference sensor measuring the surface texture of the interior wall 92 using data on the intensity of interference fringes formed by optical interference. The optical interference sensor may for example use Michelson interferometry, which is well-known, and include a light source, lens, reference mirror, image capture element, and the like. The measurement sensor 24 is not limited to an optical interference sensor, and may also be a confocal sensor that measures the surface texture of the interior wall 92 by focusing light on the interior wall 92.

The X axis displacement mechanism 30 is a drive mechanism displacing the stage 12, on which the measured object 90 rests, in the X axis direction (FIG. 1). In this example, the X axis displacement mechanism 30 is configured by a feed screw mechanism, but the X axis displacement mechanism 30 is not limited thereto and may also be configured by a belt mechanism, for example.

The Y axis displacement mechanism 32 is a drive mechanism displacing the stage 12, on which the measured object 90 rests, in the Y axis direction (FIG. 1). The Y axis displacement mechanism 32 is configured by a feed screw mechanism, for example, similar to the X axis displacement mechanism 30.

The Z axis displacement mechanism 34 is a drive mechanism displacing the Z slider 16 (measurement head 22) in the Z axis direction (FIG. 1), which is orthogonal to an XY plane. The Z axis displacement mechanism 34 brings the measurement sensor 24 opposite the interior wall 92 by lowering the measurement head 22 in the Z axis direction.

Figure 3A:
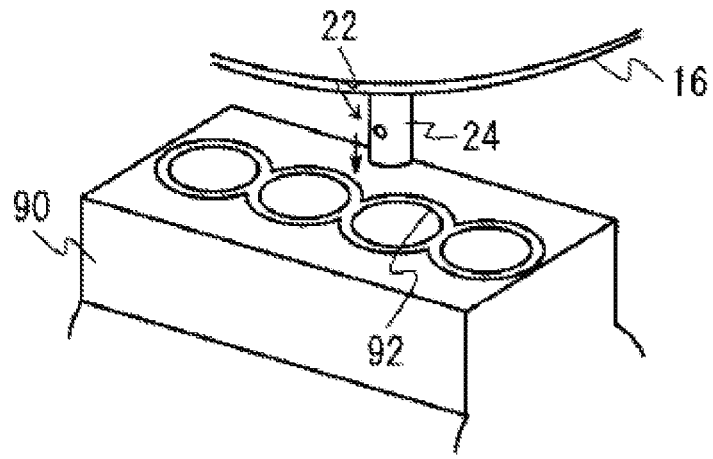
FIGS. 3A to 3C are explanatory diagrams illustrating displacement directions of a measurement head 22.
Figure 3B:
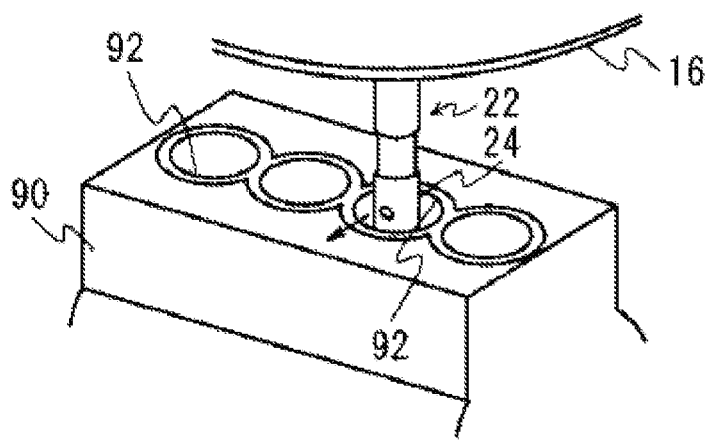
Figure 3C:
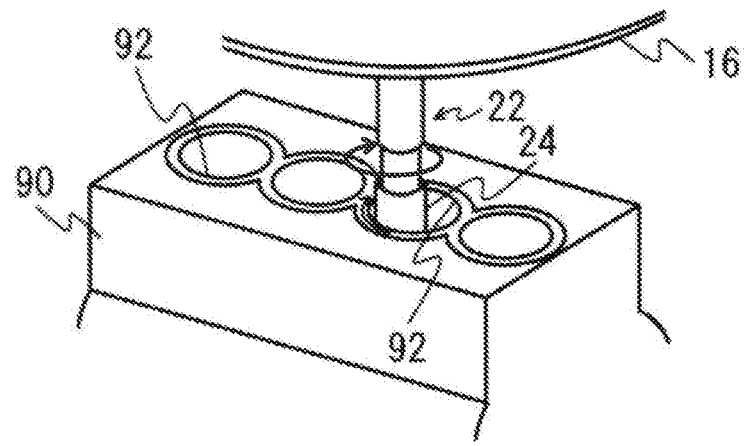

FIGS. 3A to 3C are explanatory diagrams illustrating displacement directions of the measurement head 22. By lowering the measurement head 22 in the direction of an arrow shown in FIG. 3A (specifically, by positioning the measurement sensor 24 inside the cylindrical portion), the Z axis displacement mechanism 34 brings the measurement sensor 24 opposite the interior wall 92, as shown in FIG. 3B.

The W axis displacement mechanism 36 displaces the measurement sensor 24 of the measurement head 22, which faces the interior wall 92, in a W axis direction (detection direction of the measurement sensor 24). The W axis displacement mechanism 36 displaces the measurement sensor 24 from the center of the cylindrical portion of the measured object 90 toward the interior wall 92 (direction of an arrow shown in FIG. 3B), for example. Accordingly, the measurement sensor 24 approaches the interior wall 92 closely, as shown in FIG. 3C.

When the W axis displacement mechanism 36 displaces the measurement sensor 24 in the W axis direction, the measurement sensor 24 performs a scan in a predetermined scanning range (measurement range) in the W axis direction and measures the surface texture of the interior wall 92.

The θ axis displacement mechanism 38 is a drive mechanism displacing the measurement head 22 (specifically, the measurement sensor 24), which faces the interior wall 92, along the interior wall 92. Specifically, the θ axis displacement mechanism 38 rotates the measurement sensor 24 in a θ axis direction (direction of an arrow shown in FIG. 3C), which is the circumferential direction of the cylindrical portion of the measured object 90 having a cylindrical interior wall (interior wall 92).

In the present embodiment, the interior wall 92 is divided into a plurality of measurement regions in the circumferential direction, and the measurement sensor 24 measures the surface texture of each measurement region. Accordingly, by displacing in the θ axis direction (circumferential direction) using the θ axis displacement mechanism 38, the measurement sensor 24 can measure the surface texture of each measurement region.

The control device 70 controls overall operations of the surface texture measuring apparatus 1. The control device 70 includes a memory 72 and a controller 74. The memory 72 includes, for example, a ROM (Read Only Memory) and RAM (Random Access Memory). The memory 72 stores programs executed by the controller 74 and various kinds of data. For example, the memory 72 stores measurement results of the interior wall 92 obtained by the measurement sensor 24 and analysis results of the surface texture of the interior wall 92 based on the measurement results.

The controller 74 is a CPU (Central Processing Unit), for example. The controller 74 controls operations of the surface texture measuring apparatus 1 by executing a program stored in the memory 72. For example, the controller 74 drives the X axis displacement mechanism 30, the Y axis displacement mechanism 32, the Z axis displacement mechanism 34, the W axis displacement mechanism 36, and the θ axis displacement mechanism 38, thereby enabling measurement of the interior walls 92 of the four cylinders of the cylinder block (measured object 90). In addition, the controller 74 analyzes the surface texture of the interior wall 92 based on the measurement results.

Detailed Configuration of Z Slider

Figure 4:
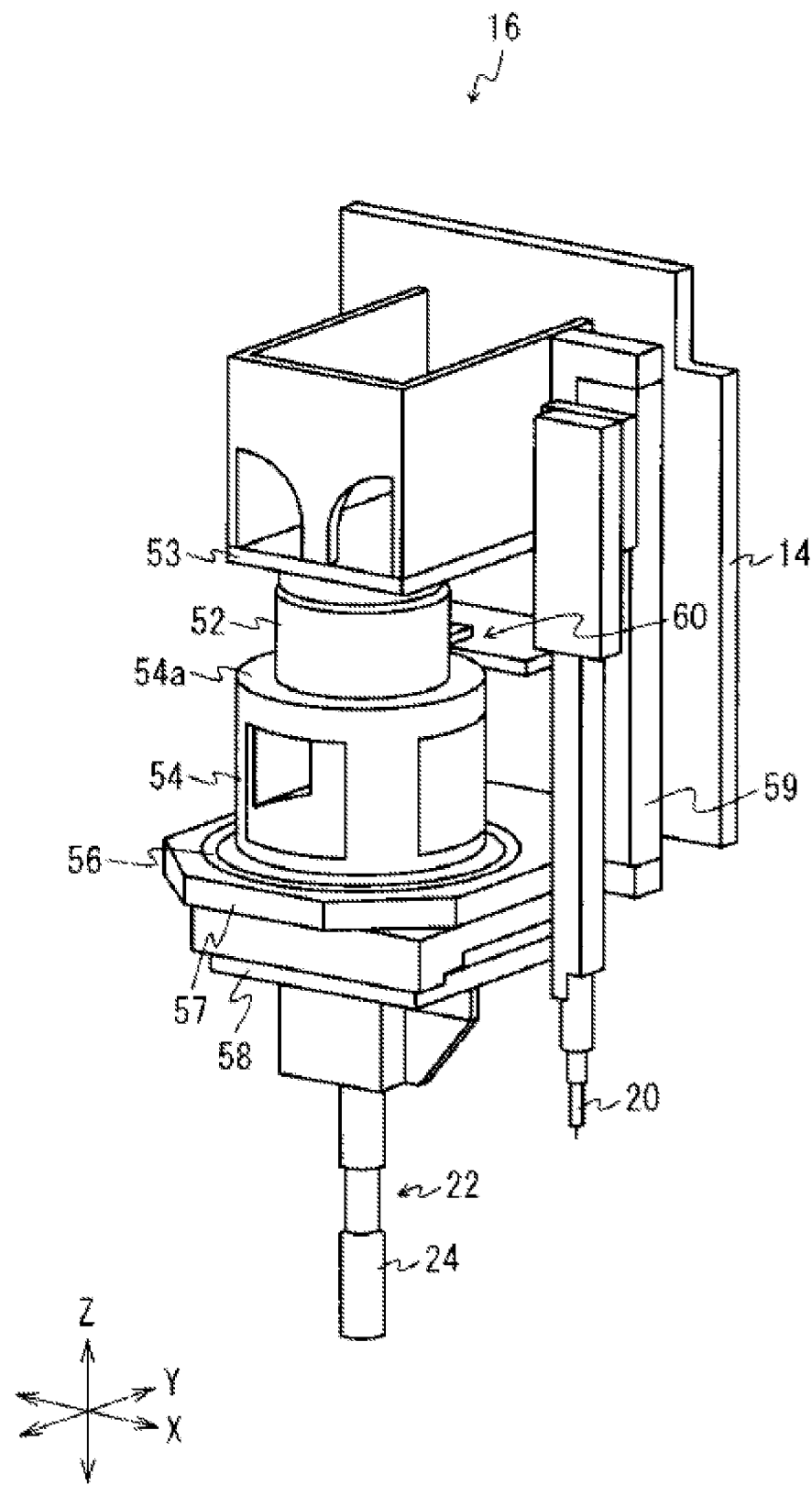
FIG. 4 is an explanatory diagram illustrating an exemplary configuration of a Z slider 16.

A detailed configuration of the Z slider 16, which is an exemplary rotation angle limiting mechanism according to the present invention, is described with reference to FIG. 4. FIG. 4 is an explanatory diagram illustrating an exemplary configuration of the Z slider 16. For ease of description, a cover covering the Z slider 16 is not depicted in FIG. 4.

As shown in FIG. 4, the Z slider 16 includes a θ axis drive motor 52, a rotating shaft 54, a support bearing 56, a support plate 58, a probe support 59, and a rotation angle limiter 60.

The θ axis drive motor 52 is a drive source that rotates the rotating shaft 54 and the measurement head 22 in the θ axis direction. The support column 14 provides cantilever support for a fixation member 53, to which the θ axis drive motor 52 is fixed.

The rotating shaft 54 is a cylindrical rotating member (rotor) that is coupled to the θ axis drive motor 52, and is rotated in the θ axis direction by the θ axis drive motor 52. A first axis direction end of the rotating shaft 54 is coupled to the θ axis drive motor 52, and a second axis direction end of the rotating shaft 54 supports the measurement head 22. Therefore, the rotating shaft 54 and the measurement head 22 rotate together. The rotating shaft 54 is capable of at least one revolution.

The support bearing 56 is provided to the second axis direction end of the rotating shall 54, and the rotating shaft 54 is supported by the θ axis drive motor 52 during rotation. The support bearing 56 is, for example, a ball bearing and is provided to an adapter plate 57, which is supported by the support column 14. By providing the support bearing 56, rotational deflection of the rotating shaft 54 can be inhibited, and therefore a decrease in measurement accuracy of the measurement bead 22, which rotates together with the rotating shaft 54, can be inhibited. Moreover, the support column 14 provides cantilever support to the fixation member 53, to which the θ axis drive motor 52 is fixated, and therefore the fixation member 53 may warp. However, by providing the support bearing 56 and supporting the rotating shaft 54, warping can be inhibited.

The support plate 58 is a flat plate-shaped member that supports the measurement head 22. While supporting the measurement head 22, the support plate 58 is displaced in the W axis direction by a W axis drive motor (not shown in the drawings). The support plate 58 rotates together with the rotating shaft 54.

The probe support 59 is provided along the Z axis direction and supports the touch probe 20 such that the touch probe 20 is capable of displacement in the Z axis direction. Specifically, the probe support 59 includes a driver and supports the touch probe 20 such that the touch probe 20 is capable of vertical displacement.

The rotation angle limiter 60 is a mechanism that limits a rotation angle of the rotating shaft 54, which supports the measurement head 22. A plurality of cables are connected to the measurement head 22, and by limiting the rotation angle of the rotating shaft 54, an excessive load caused by the cables twisting can be inhibited from acting on the cables.

Figure 5A:
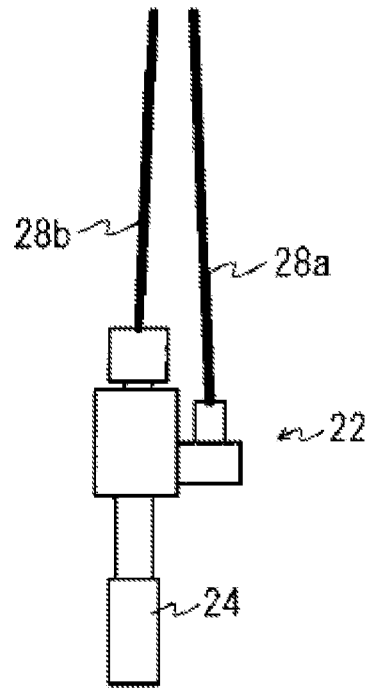
FIGS. 5A and 5B are explanatory diagrams illustrating cables connected to the measurement head 22.
Figure 5B:
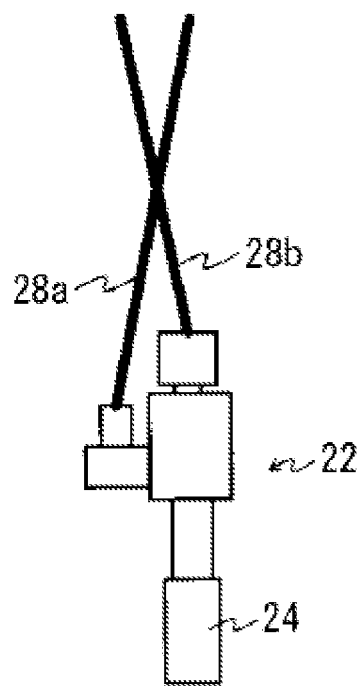

FIGS. 5A and 5B are explanatory diagrams illustrating the cables connected to the measurement head 22. A plurality of cables is connected to the measurement head 22. In this example, as illustrated in FIG. 5A, two cables 28a and 28b are connected to the measurement head 22. The cables 28a and 28b may be signal cables, power supply cables, or optical fibers, for example, that are connected to the measurement sensor 24. When the rotating shaft 54 rotates together with the measurement head 22, the cables 28a and 28b that are connected to the measurement head 22 twist as illustrated in FIG. 5B. When an amount of rotation of the rotating shaft 54 is large, the twisting of the cables 28a and 28b increases, and an excessive load may act on the cables 28a and 28b.

Detailed Configuration of Rotation Angle Limiter

Figure 6:
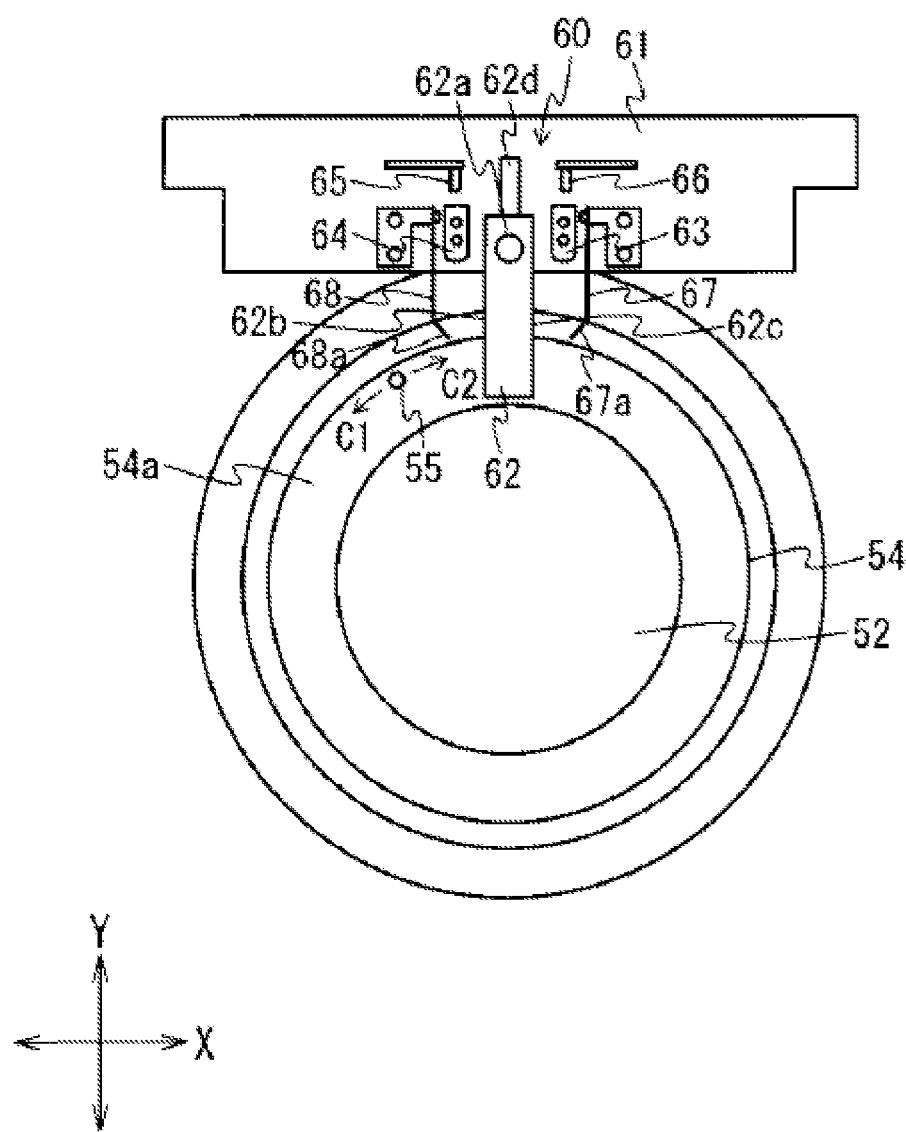
FIG. 6 is an explanatory diagram illustrating an exemplary configuration of a rotation angle limiter 60.

A detailed configuration of the rotation angle limiter 60 is described with reference to FIGS. 6 to 8D. FIG. 6 is an explanatory diagram illustrating an exemplary configuration of the rotation angle limiter 60. FIGS. 7A to 8D are explanatory diagrams illustrating exemplary operations of the rotation angle limiter 60 while the rotating shaft 54 rotates. After the state illustrated in FIG. 7D, the rotation angle limiter 60 proceeds to the state illustrated in FIG. 8A. Also, FIG. 6 illustrates a state where the rotating shaft 54 and the rotation angle limiter 60 are viewed from above the θ axis drive motor 52 of FIG. 4.

As illustrated in FIG. 6, the rotation angle limiter 60 includes an oscillating link 62, a first regulating pin 63, a second regulating pin 64, a first sensor 65, a second sensor 66, a first plate spring 67, and a second plate spring 68. The rotation angle limiter 60 limits rotation of the rotating shaft 54 in a clockwise direction C2 (first direction) that is equal to or greater than a predetermined angle (normal rotation) and rotation of the rotating shaft 54 in a counterclockwise direction C1 (second direction) that is equal to or greater than a predetermined angle (reverse rotation).

Figure 7A:
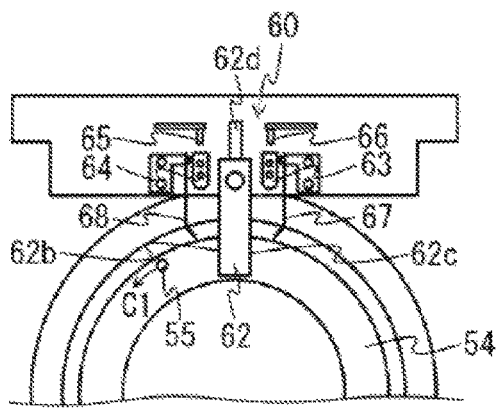
FIGS. 7A to 7D are explanatory diagrams illustrating exemplary operations of the rotation angle limiter 60 while a rotating shaft 54 rotates.
Figure 7B:
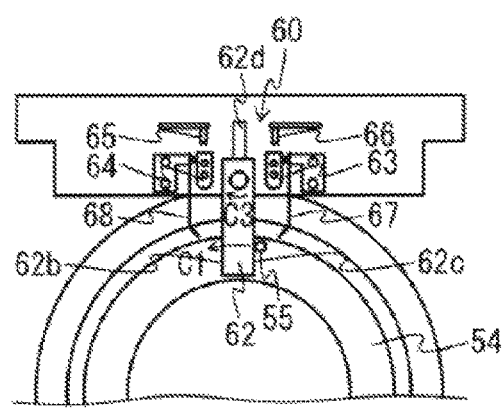
Figure 7C:
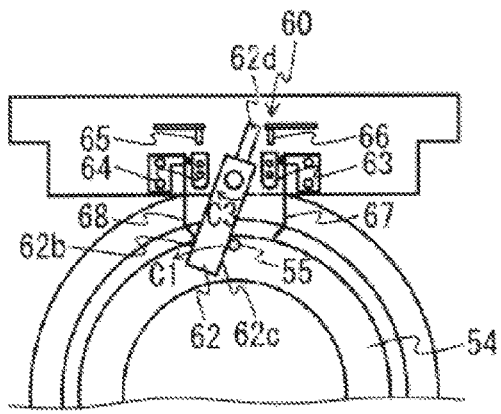
Figure 7D:
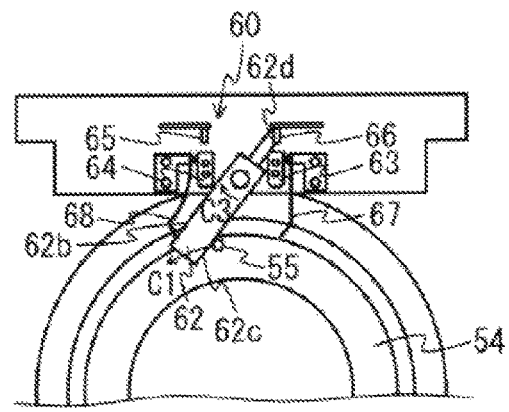

The oscillating link 62 is a flat plate-shaped link that is provided so as to be capable of oscillating centered on an oscillation pivot point 62a. The oscillating link 62 oscillates in an oscillation direction C3 illustrated in FIG. 7B and an oscillation direction C4 illustrated in FIG. 8A. Before oscillating, the oscillating link 62 occupies a standby position illustrated in FIG. 6. As illustrated in FIGS. 7B to 7D, during rotation of the rotating shaft 54, the oscillating link 62 is capable of making contact with a projecting pin 55 that is provided to the rotating shaft 54.

The oscillating link 62 is a rotation angle limiting member (limiter) that oscillates in a state of contact with the rotating shaft 54 when the rotating shaft 54 rotates in the clockwise direction C2 and limits rotation that is equal to or greater than a predetermined angle in the clockwise direction C2. Specifically, when the rotating shaft 54 rotates in the clockwise direction C2, the oscillating link 62 limits rotation that is equal to or greater than a predetermined angle in the clockwise direction C2 by oscillating by a predetermined angle in the oscillation direction C4 (one direction) from the standby position (position illustrated in FIG. 6) in a state where a side surface 62b is in contact with the projecting pin 55.

The oscillating link 62 also oscillates in a state of contact with the rotating shaft 54 when the rotating shaft 54 rotates in the counterclockwise direction C1 and limits rotation that is equal to or greater than a predetermined angle in the counterclockwise direction C1. Specifically, when the rotating shaft 54 rotates in the counterclockwise direction C1, the oscillating link 62 limits rotation that is equal to or greater than a predetermined angle in the counterclockwise direction C1 by oscillating by a predetermined angle in the oscillation direction C3 (reverse direction) from the standby position in a state where a side surface 62c on the opposite side from the side surface 62b is in contact with the projecting pin 55 (see FIG. 8A). In the present embodiment, the side surface 62b of the oscillating link 62 corresponds to a first side surface, and the side surface 62c corresponds to a second side surface.

As illustrated in FIG. 6, the first regulating pin 63 and the second regulating pin 64 are positioned on both sides of the oscillating link 62 (specifically, the oscillation pivot point 62a) and regulate the oscillation of the oscillating link 62. Specifically, when the rotating shaft 54 rotates in the clockwise direction C2, the first regulating pin 63 makes contact with the oscillating link 62, which is oscillating from the standby position in the oscillation direction C4, and regulates the oscillation of the oscillating link 62. When the rotating shaft 54 rotates in the counterclockwise direction C1, the second regulating pin 64 makes contact with the oscillating link 62, which is oscillating from the standby position in the oscillation direction C3, and regulates the oscillation of the oscillating link 62 (see FIG. 8A).

As illustrated in FIG. 6, the first sensor 65 and the second sensor 66 are positioned to the rear of the first regulating pin 63 and the second regulating pin 64. The first sensor 65 and the second sensor 66 each include an optical emitter that emits light, and an optical receiver that receives the light emitted by the optical emitter. The first sensor 65 is blocked by the oscillating link 62 when the oscillating link 62 oscillates in the oscillation direction C4. Specifically, the first sensor 65 is blocked by an optical shield 62d of the oscillating link 62 being positioned between the optical emitter and optical receiver of the first sensor 65. The second sensor 66 is blocked by the oscillating link 62 when the oscillating link 62 oscillates in the oscillation direction C3. Specifically, the second sensor 66 is blocked by the optical shield 62d of the oscillating link 62 being positioned between the optical emitter and optical receiver of the second sensor 66 (see FIG. 7D).

When the first sensor 65 or the second sensor 66 is blocked, the controller 74 stops the rotation of the rotating shaft 54. For example, when the first sensor 65 is blocked, the controller 74 stops the rotation of the rotating shaft 54 in the clockwise direction C2. In addition, when the second sensor 66 is blocked, the controller 74 stops the rotation of the rotating shaft 54 in the counterclockwise direction C1.

As illustrated in FIG. 6, the first plate spring 67 and the second plate spring 68 are provided to both sides of the oscillating link 62, and are biasing members that bias the oscillated oscillating link 62. After the projecting pin 55 is no longer in contact with the oscillating link 62, the first plate spring 67 and the second plate spring 68 can oscillate the oscillating link 62, which is blocking light, back to an original posture and can eliminate the blockage. The first plate spring 67 biases the oscillating link 62, which is oscillated in the oscillation direction C4, toward the standby position. The first plate spring 67 includes a tip portion 67a that is capable of making contact with the oscillating link 62. The first plate spring 67 warps due to oscillating in a state where the oscillating link 62 is in contact with the tip portion 67a. Then, when the first plate spring 67 is restored from the warped state to an original state, the tip portion 67a biases the oscillating link 62 toward the standby position.

The second plate spring 68 biases the oscillating link 62, which is oscillated in the oscillation direction C3, toward the standby position. The second plate spring 68 includes a tip portion 68a that is capable of making contact with the oscillating link 62. The second plate spring 68 warps due to oscillating in a state where the oscillating link 62 is in contact with the tip portion 68a (see FIG. 8A). Then, when the second plate spring 68 is restored from the warped state to an original state, the tip portion 68a biases the oscillating link 62 toward the standby position.

Next, exemplary operations of the rotation angle limiter 60 while the rotating shaft 54 rotates are described with reference to FIGS. 7A to 8D. In this example, movement from the state illustrated in FIG. 7A is designated as the rotating shaft 54 rotating in the counterclockwise direction C1. First, when the rotating shaft 54 rotates nearly one revolution in the counterclockwise direction C1 from the state illustrated in FIG. 7A, the projecting pin 55 of the rotating shaft 54 makes contact with the side surface 62c of the oscillating link 62, as illustrated in FIG. 7B. When the rotating shaft 54 further rotates in the counterclockwise direction C1 in a state where the projecting pin 55 is in contact with the side surface 62c, the oscillating link 62 oscillates in the oscillation direction C3, and the side surface 62b of the oscillating link 62 makes contact with the tip portion 68a of the second plate spring 68, as illustrated in FIG. 7C.

When the rotating shaft 54 further rotates in the counterclockwise direction C1 in a state where the side surface 62b is in contact with the tip portion 68a, the oscillating link 62 further oscillates in the oscillation direction C3, as illustrated in FIG. 7D. Accordingly, the second plate spring 68 warps, and also the optical shield 62d of the oscillating link 62 blocks the second sensor 66.

Figure 8A:
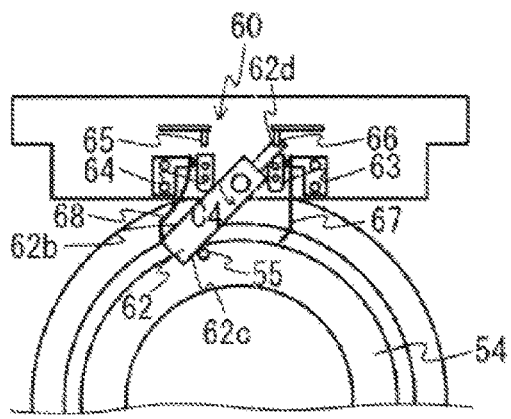
FIGS. 8A to 8D are explanatory diagrams illustrating exemplary operations of the rotation angle limiter 60 while the rotating shaft 54 rotates.

As illustrated in FIG. 8A, the rotating shaft 54 is capable of rotating up to a point where the side surface 62b makes contact with the second regulating pin 64. At that point, the second plate spring 68, which is in a state of contact with the side surface 62b, warps further. The side surface 62b makes contact with the second regulating pin 64, and thereby the rotating shaft 54 becomes unable to rotate in the counterclockwise direction C1.

Figure 8B:
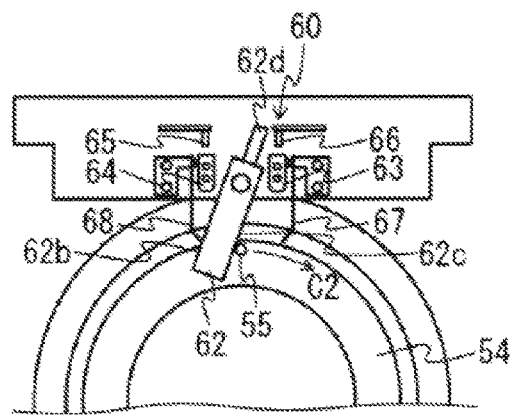

When the rotating shaft 54 in the state illustrated in FIG. 8A rotates in the clockwise direction C2, the warped second plate spring 68 is restored to the original state, as illustrated in FIG. 8B. At that point, the oscillating link 62 that is biased by the second plate spring 68 oscillates in the oscillation direction C4 due to a biasing force. Accordingly, the optical shield 62d of the oscillating link 62 also rotates and is separated from the second sensor 66, thereby eliminating the blockage on the second sensor 66, as well.

Figure 8C:
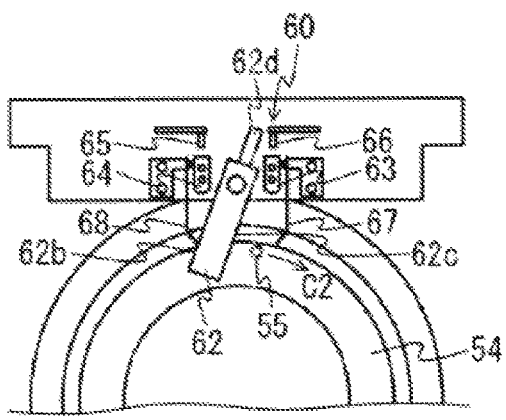
Figure 8D:
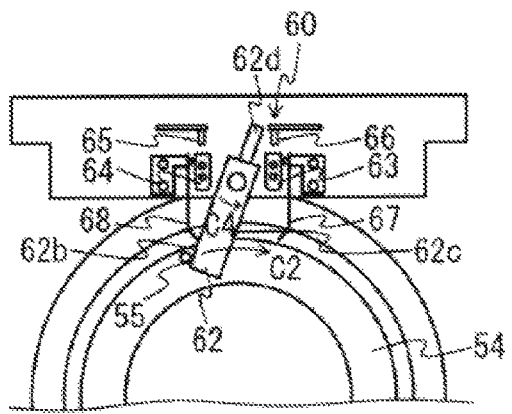

When the rotating shaft 54 continues rotating in the clockwise direction C2, the projecting pin 55 is separated from the side surface 62c of the oscillating link 62, as illustrated in FIG. 8C. Then, when the rotating shaft 54 further rotates in the clockwise direction C2, the projecting pin 55 makes contact with the side surface 62b of the oscillating link 62, as illustrated in FIG. 8D. When the rotating shaft 54 further rotates in the clockwise direction C2 in a state where the projecting pin 55 is in contact with the side surface 62b, the oscillating link 62 oscillates in the oscillation direction C4.

Rotation Control of Rotating Shaft 54 During Initialization Operations Following Power-On In the surface texture measuring apparatus 1, prior to powering on, the position of the rotating shaft 54 may be changed by a worker or the like rotating the rotating shaft 54 by hand. When the rotation angle of the rotating shaft 54 reached by manual operation exceeds a certain value, the surface texture measuring apparatus 1 is unable to ascertain how much the rotating shaft 54 has rotated, and therefore the rotating shaft 54 may rotate in excess of a limit angle specified in the design during initialization operations after the surface texture measuring apparatus 1 is powered on.

Given this, in the present embodiment, rotation control is performed in the initialization operations of the surface texture measuring apparatus 1. In the rotation control, the rotating shaft 54 is rotated in the counterclockwise direction C1 and the clockwise direction C2 to position the rotating shaft 54 at a predetermined reference position. The rotation control of the rotating shaft 54 is achieved by the controller 74 of the control device 70 executing a program stored in the memory 72.

Figure 9:
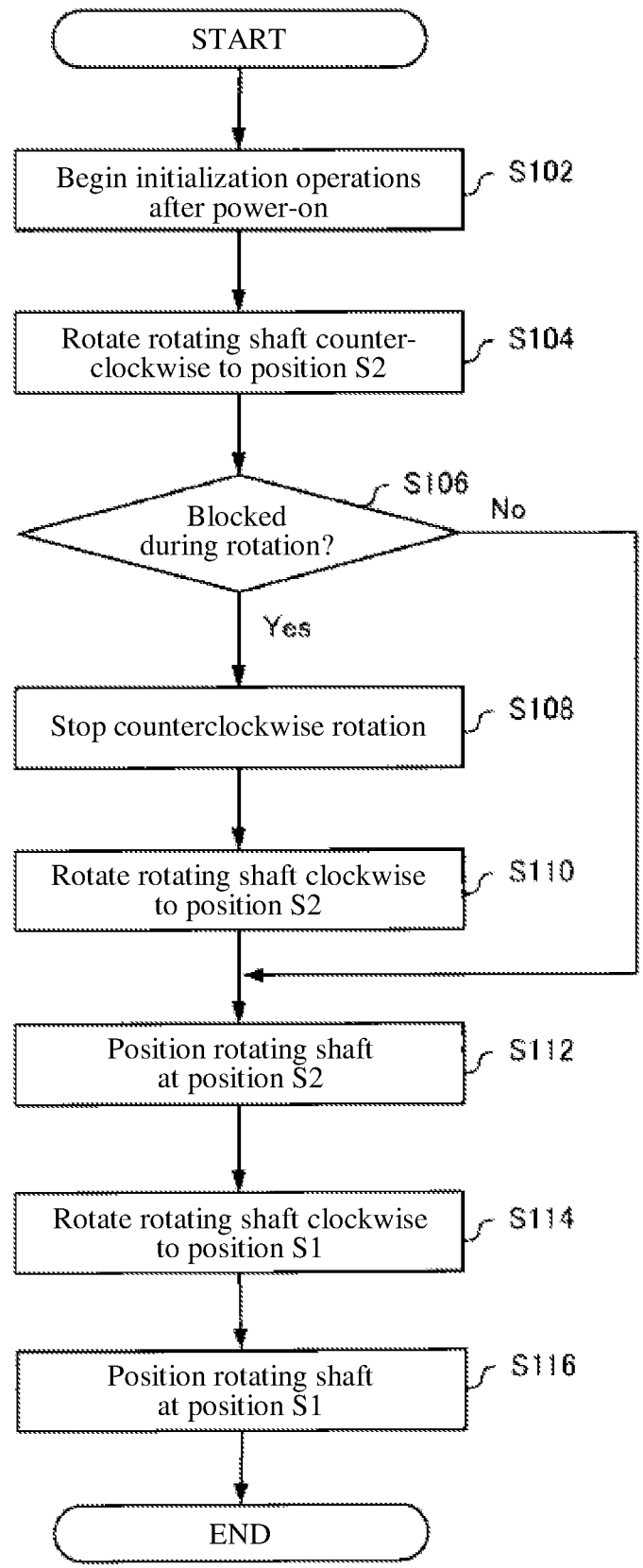
FIG. 9 is a flow chart illustrating rotation control of the rotating shaft 54 during initialization operations.

Hereafter, rotation control of the rotating shaft 54 during initialization operations is described with reference to FIGS. 9 to 10D. FIG. 9 is a flow chart illustrating the rotation control of the rotating shaft 54 during initialization operations. FIGS. 10A to 10D are schematic views illustrating rotation control that is performed in accordance with a position of the projecting pin 55 during initialization operations. FIGS. 10A to 10D respectively illustrate cases 1 to 4, in each of Which the position of the projecting pin 55 prior to rotation differs. Also, positions S1 and S2 illustrated in FIGS. 10A to 10D indicate a control position of the projecting pin 55. In this example, the position S1 is a position at 0° and the position S2 is a position at 180°. In the present embodiment, when the projecting pin 55 occupies the position S1, the rotating shaft 54 occupies the reference position.

The flow chart of FIG. 9 begins at a point where initialization operations are begun following powering-on of the surface texture measuring apparatus 1 (step S102). Next, the controller 74 rotates the rotating shaft 54 in the counterclockwise direction C1 to the position S2 (position at 180°) (step S104).

While the rotating shaft 54 is rotating to the position S2, the controller 74 determines Whether the second sensor 66 is blocked (step S106). In case 1 (illustrated in FIG. 10A) or case 4 (illustrated in FIG. 10D), the rotating shaft 54 performs the rotation indicated by (1) in FIGS. 10A and 10D, and thereby the projecting pin 55 does not cause the oscillating link 62 to oscillate. Therefore, the second sensor 66 is not blocked (step S106: No), and the rotating shaft 54 occupies the position S2 (step S112).

Figure 10A:
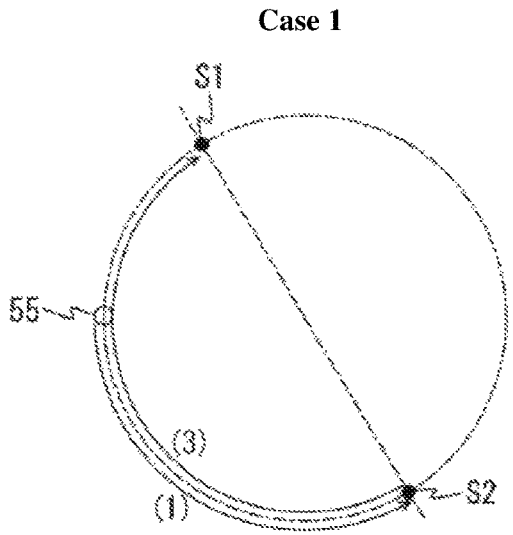
FIGS. 10A to 10D are schematic views illustrating rotation control that is performed in accordance with a position of a projecting pin 55 during initialization operations.
Figure 10B:
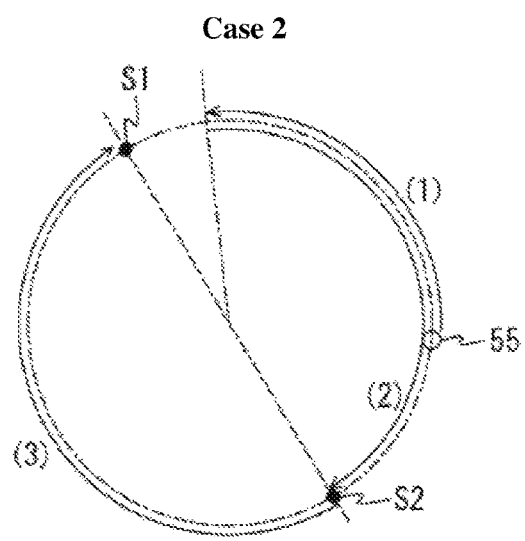
Figure 10C:
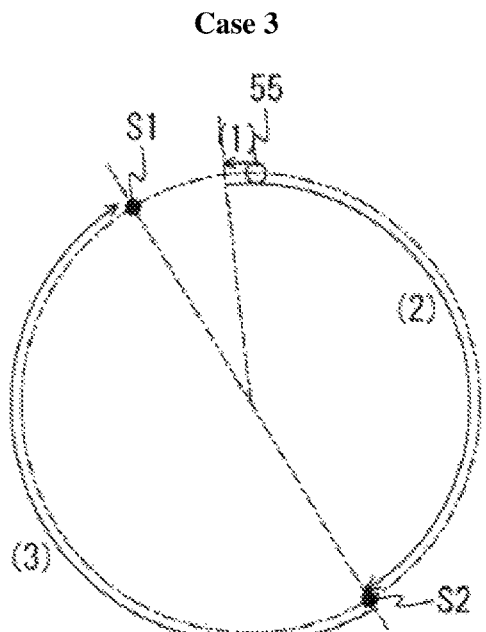
Figure 10D:
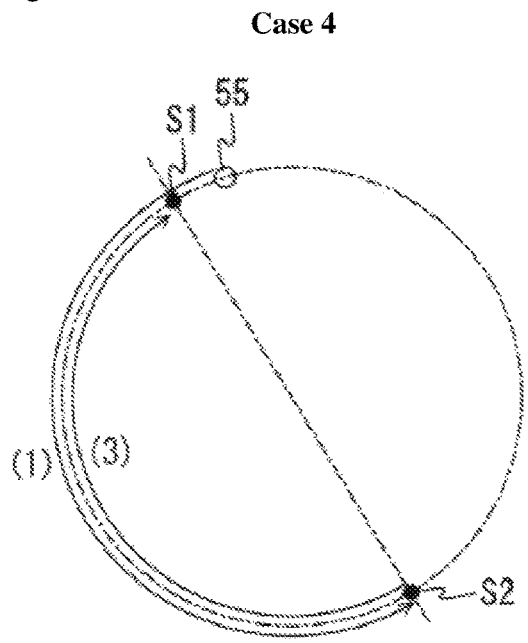

Meanwhile, in case 2 (illustrated in FIG. 10B) or case 3 (illustrated in FIG. 10C), the rotating shaft 54 performs the rotation indicated by (1) in FIGS. 10B and 10C, and thereby the projecting pin 55 makes contact with the oscillating link 62 and causes the oscillating link 62 to oscillate, and the second sensor 66 is blocked (step S106: Yes). When this happens, the controller 74 stops the rotation of the rotating shaft 54 in the counterclockwise direction C1 (step S108). Then, the controller 74 rotates the rotating shaft 54 in the clockwise direction C2 to the position S2 (step S110). In other words, by performing the rotation indicated by (2) in FIGS. 10B and 10C, the rotating shaft 54 occupies the position S2 (step S112).

Next, the controller 74 rotates the rotating shaft 54 in the clockwise direction C2 to the position S1 (position at 0°) (step S114). In other words, by performing the rotation indicated by (3) in FIGS. 10A to 10D, the rotating shaft 54 occupies the position S1 (step S116). Accordingly, even when the rotating shaft 54 rotates prior to powering on, the rotating shaft 54 is positioned at the reference position after the initialization operations following power-on are complete. According to the control scheme described above, the rotating shaft 54 is always positioned at the reference position after the initialization operations are complete, and therefore when using the surface texture measuring apparatus 1 thereafter, the position of the rotating shaft 54 can be supervised with a high degree of accuracy.

Benefits of the Present Embodiment

In the Z slider 16 according to the present embodiment described above, the rotating shaft 54 supporting the measurement head 22, which is connected to the plurality of cables 28a and 28b, rotates in the clockwise direction C2 and the counterclockwise direction C1. Furthermore, the oscillating link 62 oscillates in a state of contact with the rotating shaft 54 rotating in the clockwise direction C2, and the rotating shaft 54 limits rotation that is equal to or greater than a predetermined angle in the clockwise direction C2. Also, the oscillating link 62 oscillates in a state of contact with the rotating shaft 54 rotating in the counterclockwise direction C1, and the rotating shaft 54 limits rotation that is equal to or greater than a predetermined angle in the counterclockwise direction C1. According to the configuration described above, the rotating shaft 54 rotates a little over a single revolution because the rotation of the rotating shaft 54 is limited by the oscillating link 62. Therefore, because the rotation angle of the measurement head 22, which rotates together with the rotating shaft 54, is also similarly constrained, twisting of the cables 28a and 28b that are connected to the measurement head 22 can be inhibited. As a result, an excessive load on the cables 28a and 28b caused by the twisting of the cables 28a and 28b can be prevented. Meanwhile, the rotating shaft 54 can rotate a little over a single revolution, and therefore a measurement of the surface texture of the interior wall 92 of the cylindrical portion can be performed adequately by the measurement sensor 24 of the measurement head 22.

In the above, the interior wall 92 of the measured object 90 is the interior wall of a cylindrical portion. However, the interior wall 92 is not limited to this. For example, the interior wall 92 may also be an interior wall of a squared tube.

In addition, in the above, the rotation angle limiting mechanism is installed in the surface texture measuring apparatus 1 and limits the rotation angle of the rotating shaft 54. However, the rotation angle limiting mechanism is not limited to this. For example, so long as the rotation angle limiter 60 can limit the rotation angle of a rotating member that supports a support body connected to a cable, the rotation angle limiter 60 may be installed in a machine tool or other device.

The present invention is described above by way of an embodiment, but the technical scope of the present invention is not limited to that described in the embodiment above, and various modifications are possible within the scope of the description. For example, the specific embodiments of separated or integrated devices are not limited to the embodiment given above, and all or a portion thereof can be configured to be functionally or physically separated or integrated in any desired units. In addition, novel embodiments produced by the arbitrary combination of a plurality of embodiments are also included in the scope of the embodiment of the present invention. The benefits of a novel embodiment produced by such combination also include the benefits of the original embodiment of the present invention.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A rotation angle limiting mechanism comprising:
   a rotor configured to perform at least one revolution centered on a predetermined rotation axis, in a configuration where the rotor is affixed to a support that is connected to a plurality of cables, the rotor comprising a projecting pin on an upper surface thereof, a longitudinal axis of the projecting pin extending along a direction parallel to the predetermined rotation axis;
   a driver connected to the rotor and causing the rotor to perform normal rotation in a first direction, and to perform reverse rotation in a second direction that is a reverse direction of the first direction;
   a rotation angle limiter that:
      oscillates in a state of contact with the rotor when the rotor is performing normal rotation in the first direction, and limits normal rotation in the first direction that is greater than or equal to a first predetermined angle, and
      oscillates in a state of contact with the rotor when the rotor is performing reverse rotation in the second direction, and limits reverse rotation in the second direction that is greater than or equal to than a second predetermined angle, wherein the projecting pin is configured to contact the rotation angle limiter;
   a first sensor that is blocked by the rotation angle limiter oscillating in the first direction;
   a second sensor that is blocked by the rotation angle limiter oscillating in the second direction; and
   a controller that stops the normal rotation of the rotor in the first direction when the first sensor is blocked, and stops reverse rotation of the rotor in the second direction when the second sensor is blocked, wherein the controller:
rotates the rotor in the second direction to a predetermined rotation position during initialization operations after powering on a device in which the rotation angle limiting mechanism is installed;
when the second sensor is not blocked until the rotor is rotated to the predetermined rotation position, rotates the rotor that is positioned in the predetermined rotation position in the first direction to position the rotor at a reference position; and
when the second sensor is blocked during rotation toward the predetermined rotation position, rotates the rotor, for which rotation in the second direction is stopped, in the first direction to position the rotor at the predetermined rotation position, and then further rotates the rotor in the first direction to position the rotor at the reference position.

2. The rotation angle limiting mechanism according to claim 1, wherein the support is a measurement head configured to measure a surface texture of an interior wall of a measured object without contact.

3. The rotation angle limiting mechanism according to claim 2, wherein:
when the rotor performs normal rotation in the first direction, the rotation angle limiter limits normal rotation that is greater than or equal to the first predetermined angle in the first direction by oscillating by the first predetermined angle in one direction from a standby position, in a state where a first side surface of the rotation angle limiter is in contact with the projecting pin, and
when the rotor performs reverse rotation in the second direction, the rotation angle limiter limits reverse rotation that is greater than or equal to the second predetermined angle in the second direction by oscillating by the second predetermined angle in the reverse direction from the standby position, in a state where a second side surface on the opposite side from the first side surface is in contact with the projecting pin.

4. The rotation angle limiting mechanism according to claim 3, further comprising:
a first regulating pin which, when the rotor performs normal rotation in the first direction, contacts the rotation angle limiter oscillating in the one direction from the standby position and regulates the oscillation of the rotation angle limiter; and
a second regulating pin which, when the rotor performs reverse rotation in the second direction, contacts the rotation angle limiter oscillating in the reverse direction from the standby position and regulates the oscillation of the rotation angle limiter.

5. The rotation angle limiting mechanism according to claim 4, further comprising:
a first spring configured to bias the rotation angle limiter oscillating in the one direction toward the standby position; and
a second spring configured to bias the rotation angle limiter oscillating in the reverse direction toward the standby position.

6. The rotation angle limiting mechanism according to claim 4, wherein during the initialization operations after powering on a device in which the rotation angle limiting mechanism is installed, the controller is configured to:
perform normal rotation in the first direction,
perform reverse rotation in the second direction for the rotor, and
position the rotor in a reference position.

7. The rotation angle limiting mechanism according to claim 3, further comprising:
a first spring configured to bias the rotation angle limiter oscillating in the one direction toward the standby position; and
a second spring configured to bias the rotation angle limiter oscillating in the reverse direction toward the standby position.

8. The rotation angle limiting mechanism according to claim 3, wherein during the initialization operations after powering on a device in which the rotation angle limiting mechanism is installed, the controller is configured to:
perform normal rotation in the first direction,
perform reverse rotation in the second direction for the rotor, and
position the rotor in a reference position.

9. The rotation angle limiting mechanism according to claim 1, wherein:
when the rotor performs normal rotation in the first direction, the rotation angle limiter limits normal rotation that is greater than or equal to the first predetermined angle in the first direction by oscillating by the first predetermined angle in one direction from a standby position, in a state where a first side surface of the rotation angle limiter is in contact with the projecting pin, and
when the rotor performs reverse rotation in the second direction, the rotation angle limiter limits reverse rotation that is greater than or equal to the second predetermined angle in the second direction by oscillating by the second predetermined angle in the reverse direction from the standby position, in a state where a second side surface on the opposite side from the first side surface is in contact with the projecting pin.

10. The rotation angle limiting mechanism according to claim 9, further comprising:
a first regulating pin which, when the rotor performs normal rotation in the first direction, contacts the rotation angle limiter oscillating in the one direction from the standby position and regulates the oscillation of the rotation angle limiter; and
a second regulating pin which, when the rotor performs reverse rotation in the second direction, contacts the rotation angle limiter oscillating in the reverse direction from the standby position and regulates the oscillation of the rotation angle limiter.

11. The rotation angle limiting mechanism according to claim 10, further comprising:
a first spring configured to bias the rotation angle limiter oscillating in the one direction toward the standby position; and
a second spring configured to bias the rotation angle limiter oscillating in the reverse direction toward the standby position.

12. The rotation angle limiting mechanism according to claim 10, wherein during the initialization operations after powering on a device in which the rotation angle limiting mechanism is installed, the controller is configured to:
perform normal rotation in the first direction,
perform reverse rotation in the second direction for the rotor, and
position the rotor in a reference position.

13. The rotation angle limiting mechanism according to claim 9, further comprising:

a first spring configured to bias the rotation angle limiter oscillating in the one direction toward the standby position; and a second spring configured to bias the rotation angle limiter oscillating in the reverse direction toward the standby position.

14. The rotation angle limiting mechanism according to claim 9, wherein during the initialization operations after powering on a device in which the rotation angle limiting mechanism is installed, the controller is configured to:

perform normal rotation in the first direction, perform reverse rotation in the second direction for the rotor, and position the rotor in a reference position.

15. The rotation angle limiting mechanism according to claim 1, wherein:

the driver is provided at a first axis direction end of the rotation axis, and a bearing is further provided to a second axis direction end and supports the rotor.

16. A rotation angle limiting mechanism, comprising:

a rotor configured to perform at least one revolution centered on a predetermined rotation axis, in a configuration where the rotor is affixed to a support that is connected to a plurality of cables, the rotor comprising a projecting pin;

a driver connected to the rotor and causing the rotor to perform normal rotation in a first direction, and to perform reverse rotation in a second direction that is a reverse direction of the first direction;

a first sensor;

a second sensor;

a controller; and a rotation angle limiter that:

oscillates in a state of contact with the rotor when the rotor is performing normal rotation in the first direction, and limits normal rotation in the first direction that is greater than or equal to a first predetermined angle, and oscillates in a state of contact with the rotor when the rotor is performing reverse rotation in the second direction, and limits reverse rotation in the second direction that is greater than or equal to than a second predetermined angle, wherein:

the projecting pin is configured to contact the rotation angle limiter, when the rotor performs normal rotation in the first direction, the rotation angle limiter limits normal rotation that is greater than or equal to the first predetermined angle in the first direction by oscillating by the first predetermined angle in one direction from a standby position, in a state where a first side surface of the rotation angle limiter is in contact with the projecting pin, when the rotor performs reverse rotation in the second direction, the rotation angle limiter limits reverse rotation that is greater than or equal to the second predetermined angle in the second direction by oscillating by the second predetermined angle in the reverse direction from the standby position, in a state where a second side surface on the opposite side from the first side surface is in contact with the projecting pin, the first sensor is blocked by the rotation angle limiter oscillating in the one direction, the second sensor is blocked by the rotation angle limiter oscillating in the reverse direction, during initialization operations after powering on a device in which the rotation angle limiting mechanism is installed, the controller is configured to:

perform normal rotation in the first direction, perform reverse rotation in the second direction for the rotor, and position the rotor in a reference position, the controller:

stops the normal rotation of the rotor in the first direction when the first sensor is blocked, and stops the reverse rotation of the rotor in the second direction when the second sensor is blocked, rotates the rotor in the second direction to a predetermined rotation position during the initialization operations, when the second sensor is not blocked until the rotor is rotated to the predetermined rotation position, rotates the rotor that is positioned in the predetermined rotation position in the first direction to position the rotor at the reference position, and when the second sensor is blocked during rotation toward the predetermined rotation position, rotates the rotor, for which rotation in the second direction is stopped, in the first direction to position the rotor at the predetermined rotation position, and then further rotates the rotor in the first direction to position the rotor at the reference position.

* * * * *